United States Patent [19]

Oechslin

[11] Patent Number: 4,825,426
[45] Date of Patent: Apr. 25, 1989

[54] HOROMETRIC ARRANGEMENT FOR INDICATING THE POSITION OF THE PLANETS

[75] Inventor: Ludwig Oechslin, Lucerne, Switzerland

[73] Assignee: Ulysse Nardin S.A., Switzerland

[21] Appl. No.: 92,665

[22] Filed: Sep. 3, 1987

[30] Foreign Application Priority Data

Sep. 5, 1986 [CH] Switzerland .................. 03573/86

[51] Int. Cl.⁴ .............................................. G04B 19/26
[52] U.S. Cl. ........................................ 368/15; 368/16
[58] Field of Search .................................. 368/15–18

[56] References Cited

U.S. PATENT DOCUMENTS 2,008,734  7/1935  Weems ................................ 368/20
4,711,583 12/1987  Oechslin et al. ..................... 368/16

FOREIGN PATENT DOCUMENTS 7712217  5/1979  Netherlands ........................ 368/16

Primary Examiner—Bernard Roskoski
Attorney, Agent, or Firm—Pollock, Vande Sande & Priddy

[57] ABSTRACT

In the arrangement of this invention the position of the planets is displayed by means of a disc and rings concentric thereto, the display surfaces of which are arranged substantially in the same plane.

11 Claims, 9 Drawing Sheets

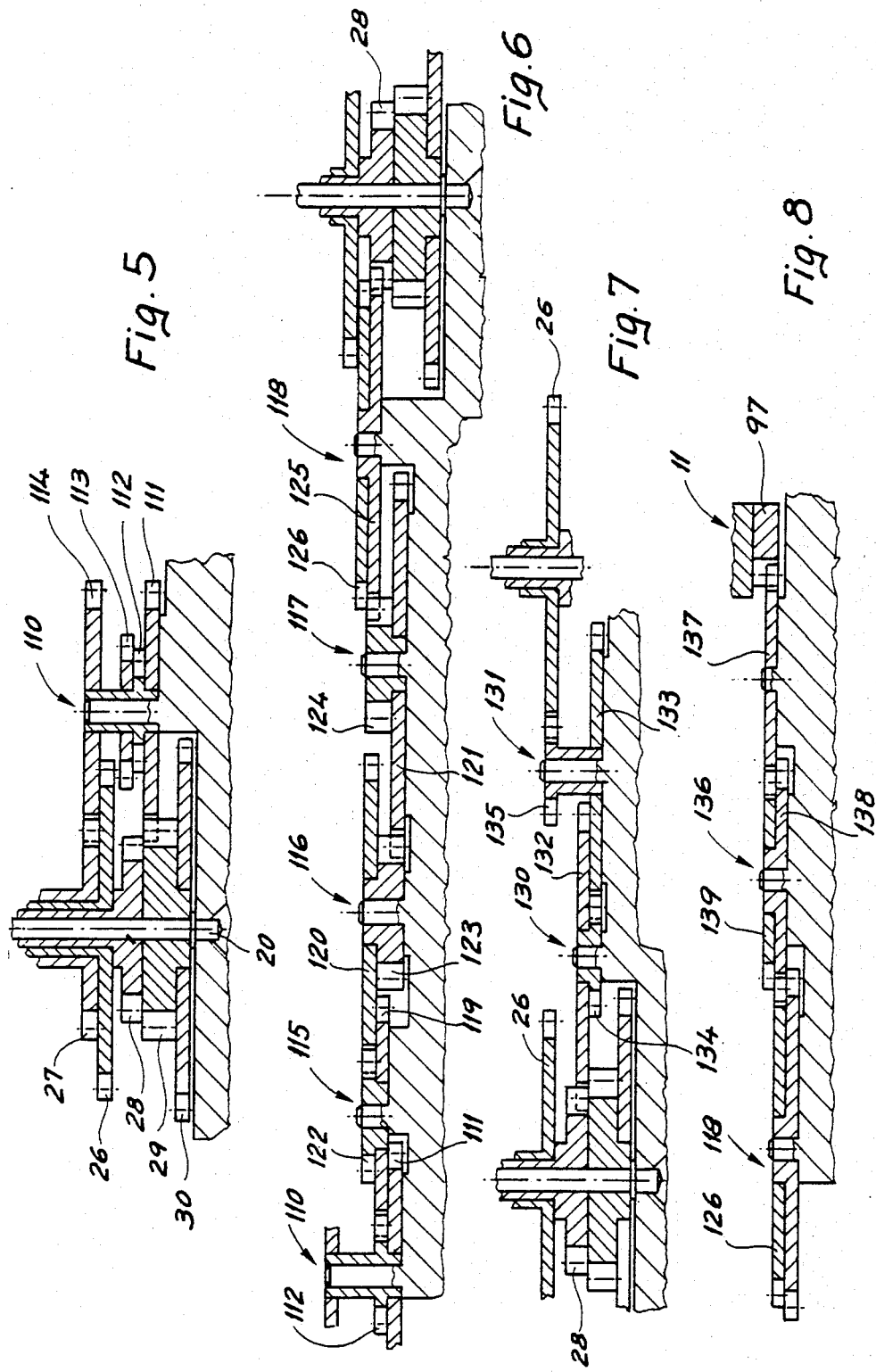

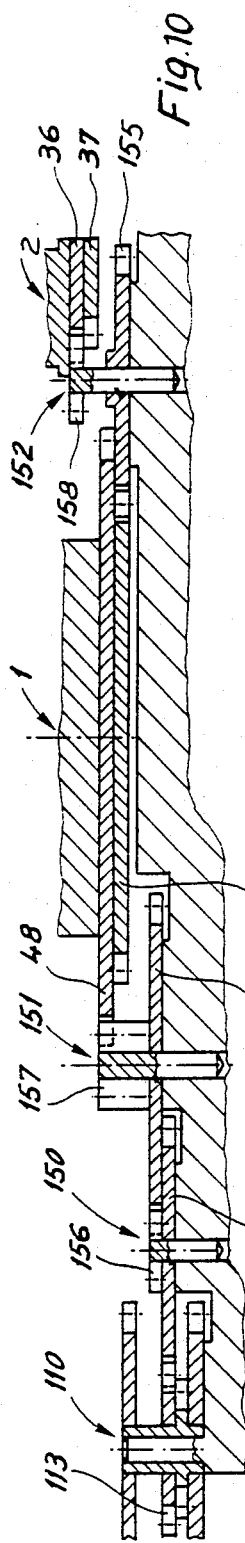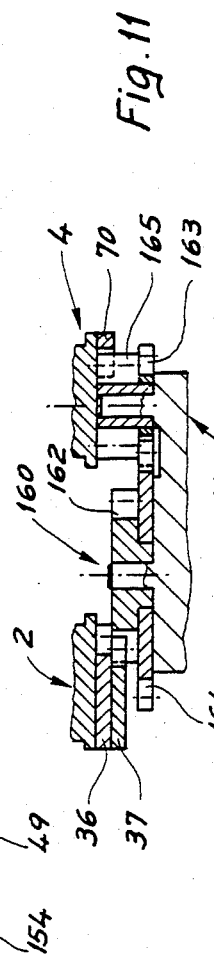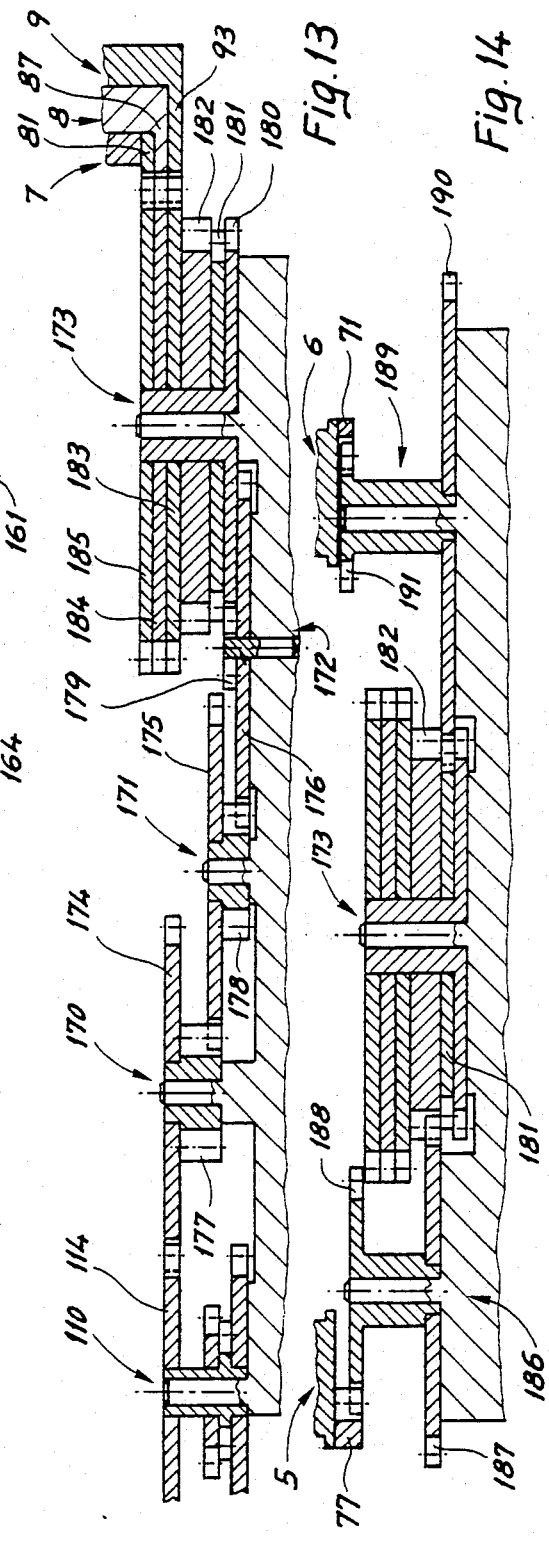

HOROMETRIC ARRANGEMENT FOR INDICATING THE POSITION OF THE PLANETS

The object of this invention is to provide an indicating arrangement for the position of the planets. This arrangement includes a support, display means and means for driving the display means. The display means comprise a plurality of moving elements each having a display surface provided with a distinctive sign representing one of the planets.

BACKGROUND OF THE INVENTION

Such arrangements known under the designation of planetariums, are generally associated with astronomical clocks. It has likewise been suggested to provide such an arrangement on portable timepieces. One of these is described in the Swiss patent No. 627.042. This patent describes a watch including two faces, one of which is provided with means indicating the time of day, the date and the phase of the moon, the other being provided with superposed discs turning around a common axis, each disc bearing the distinctive sign of a planet. The driving means for the discs includes superposed wheels coaxial to such discs with one wheel per disc. It will be readily understood that such an arrangement requires a considerable thickness.

A purpose of this invention is to provide a planetarium having a substantially reduced thickness.

In the arrangement described in Swiss patent No. 627.042, the planets turn around the Sun at an angular velocity equal to their average speed of rotation around the Sun, the frame of reference being defined by the stellar system.

As has been previously mentioned, the indication of the phase of the moon is achieved in this arrangement on the first face of the watch, i.e. that bearing the time indications. However, such an indication forms an integral portion of the astronomical information. This information cannot be associated with the arrangement described without considerably increasing the volume and fundamentally reconsidering the construction since it would be necessary to mount pivotally and drive a lunar disc on the disc bearing the earth indication.

A further purpose of this invention is to obtain a planetarium enabling the display of information associated with the earth and the moon in a reduced volume.

According to a particular feature of the invention the reference system is no longer that of the stellar system, but rather that of the set formed by the Sun and the Earth. In this manner it is possible to complete the planetarium by complementary display elements associated with the movement of the moon around the earth, these elements being pivotally mounted on the support itself.

In a planetarium having dimensions as limited as possible, one may be satisfied to represent only the planets closest to the earth which is the case in the previously cited document or otherwise to represent the most distant planets on circles which are closer to the center than they would be if one employed the same scale as that employed for the closer planets. There results therefrom that the measurement of the angular position of the planets relative to the earth is distorted by a parallax effect.

Another purpose of this invention is to resolve this problem.

SUMMARY OF THE INVENTION

The invention thus basically comprises an arrangement for indicating the position of the planets in the solar system including a support and means displaying said position pivotally mounted on said support, comprising a plurality of movable elements rotatable about a common axis, each of said movable elements having a display surface bearing a distinctive sign associated with one of said planets, said arrangement further including means for driving each of said movable elements in rotation about said axis, said display surfaces being arranged substantially in the same plane.

The invention will be better understood through reading of the following description having reference to the attached drawings.

BRIEF DESCRIPTION OF THE DRAWINGS

FIGS. 5 to 8 each represent a portion of the gear train of FIG. 4 to drive respectively the display means associated with the Earth, the Moon, the Dragon hand and the display associated with the ecliptic;

FIG. 10 is a cross-section of the gear train driving the display elements associated with Mercury and Venus;

FIG. 11 is a cross-section of the gear train driving the display element associated with Mars;

FIGS. 13 and 14 show respectively cross-sectional views of the gear trains for driving the display elements associated with Uranus, Neptune and Pluto and Saturn and Jupiter.

DESCRIPTION OF THE PREFERRED EMBODIMENT

Figure 1:
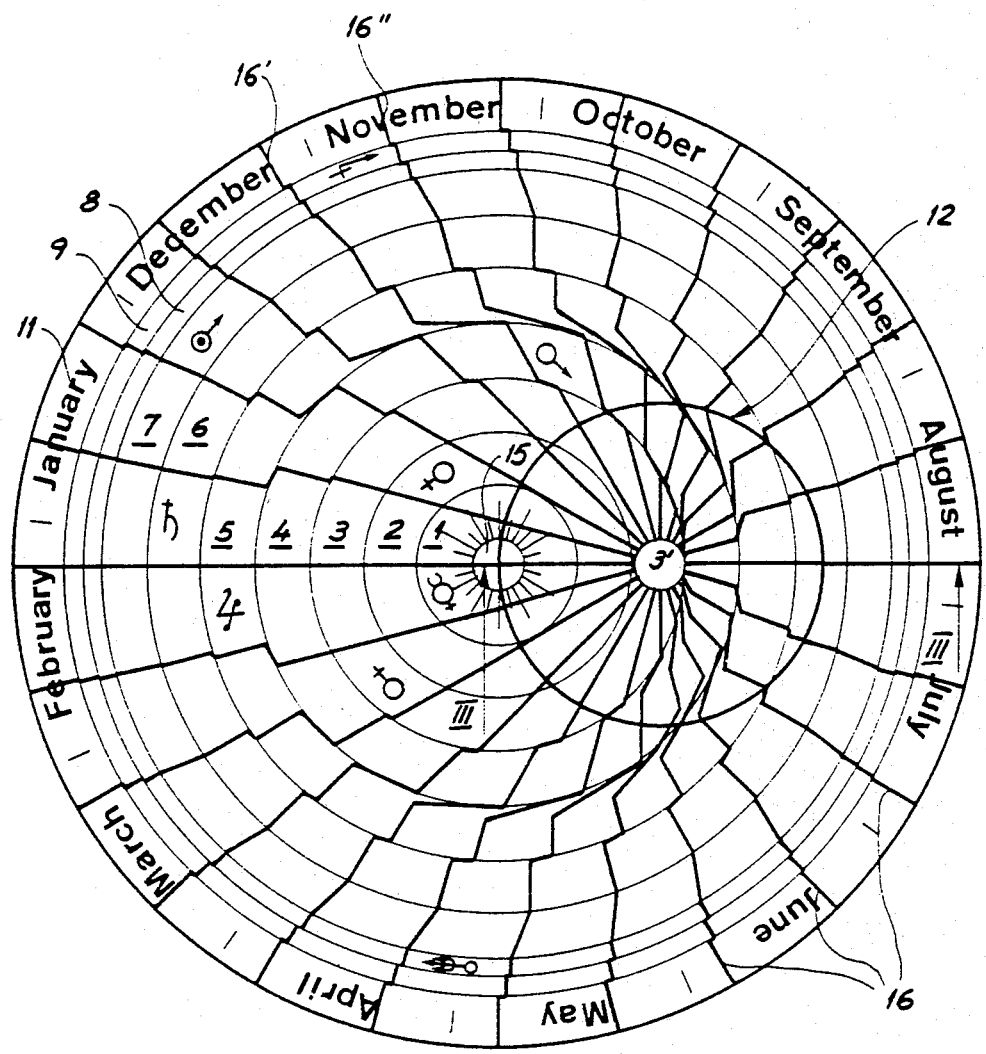
FIG. 1 represents an assembled view of a planetarium according to the invention and in particular the display means of the astronomical functions.

The arrangement shown on FIG. 1 represents a planetarium enabling the display of information relative to the position of the principal heavenly bodies of the solar system, more particularly the planets, by means of a central disc 1 and of eight rings concentric thereto numbered from 2 to 9 associated respectively with Mercury, Venus, Earth, Mars, Jupiter, Saturn, Uranus, Neptune and Pluto, the Earth ring 3 being fixed for reasons which will be explained hereinafter. A ninth peripheral ring 11 concentric to the foregoing bears information relative to the ecliptic. The arrangement is furthermore provided with display means associated with the Earth and the Moon. These means are more particularly shown on FIG. 2. They include a disc 12 effecting one rotation in 24 hours and schematically representing the Earth, a first hand 13 effecting a rotation in a little more than 29 days and bearing the symbol of the Moon and a second hand 14, referred to as the Dragon hand, the function and the speed of rotation of which will be set forth hereinafter. These latter display means are pivotally mounted on ring 3 associated with the Earth in a manner which will likewise be set forth in detail hereinafter.

It is necessary to mention that the Sun does not include specific display means. Its position being blended with the rotation axis of disc 1 and the rings 2 to 9, it has simply been shown by the central image 15 borne by disc 1, this latter serving furthermore to display on its periphery the position of Mercury.

It is further to be mentioned with respect to FIG. 1 that the distance between the Sun and each of the planets does not follow a single scale. It will be readily understood that if the scale were the same, either the most distant planets could not be shown, or the dimensions of the planetarium would render it impossible to transport. This is due to the fact that the ratio of the distance from the Sun to Pluto and to Mercury respectively is greater than 100. On FIG. 1 the planets situated beyond the Earth in the solar system are all closer to the center than they should be if the scale were uniform. This does not however change anything as to the relative position of the planets with reference to the Sun. It is not the same for the relative position of the planets seen from the Earth, since this change of scale brings about a parallax error. In order nevertheless to be able to measure the position of each of the planets, the arrangement according to the invention includes a polar reticulated network centered on the earth and obtained by means of 24 broken lines distributed in a cluster 16, the center of which coincides with the position of the Earth.

The distance between two broken lines corresponds thus to an angle of 15°. This network is advantageously borne by a glass 17 placed in front of the display means and shown on FIG. 3.

In order to read the position of a planet seen from the Earth relative to the Sun, it is necessary to consider that the observer is located at point 3' of ring 3, this point corresponding to the position of the Earth in the solar system. Next it is necessary to localize the planet the position of which it is wished to determine. Thus, Pluto, shown on ring 9, is located substantially midway between brokenlines 16' and 16". There are four brokenlines between the zone occupied by Pluto and the line connecting the Earth to the Sun. Furthermore, seen from the Earth, Pluto is found to the right of the Sun. Four brokenlines represent 60°. This is as much as to say that the angle between the Sun and Pluto seen from the Earth is substantially equal to 67° and that Pluto is located to the West of the Sun.

These discs, rings and hands are driven by gear trains coupled to the wheel train of a timepiece. The characteristics of this timepiece not having any particular originality, such has not been shown on the drawing.

It is now opportune to explain the function of the Dragon hand. This hand is the sole display element not directly associated with the motion of a heavenly body. It enables determination of eclipses of the Moon and the Sun. More precisely, there is an eclipse of the Moon when the Moon hand 13 and the Dragon hand 14 are superposed on the line connecting the Sun and the Earth at the side remote from the Sun. There is an eclipse of the Sun when the Moon hand 13 and the Dragon hand 14 are superposed on the line connecting the Sun and the Earth in the space included between these two bodies This hand effects a rotation in a little more than 346 days as will be seen hereinafter.

Figure 2:
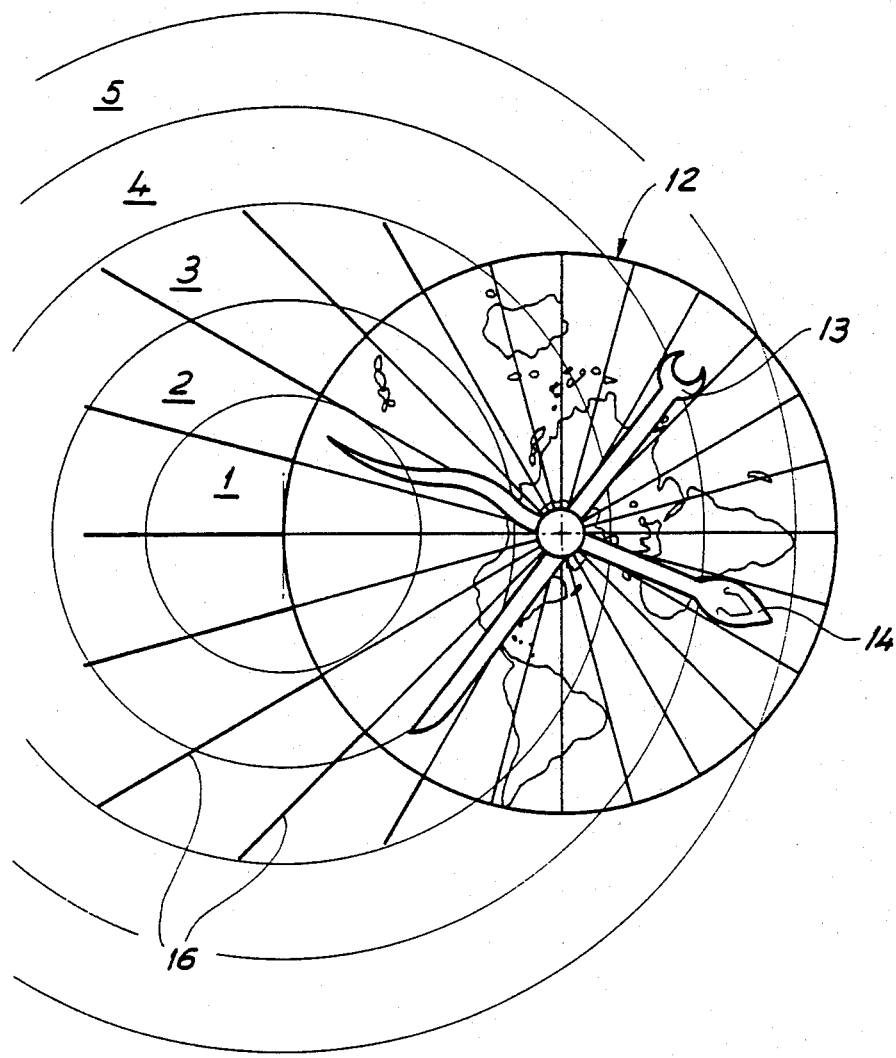
FIG. 2 is an enlarged view of a portion of the arrangement of FIG. 1.
Figure 3:
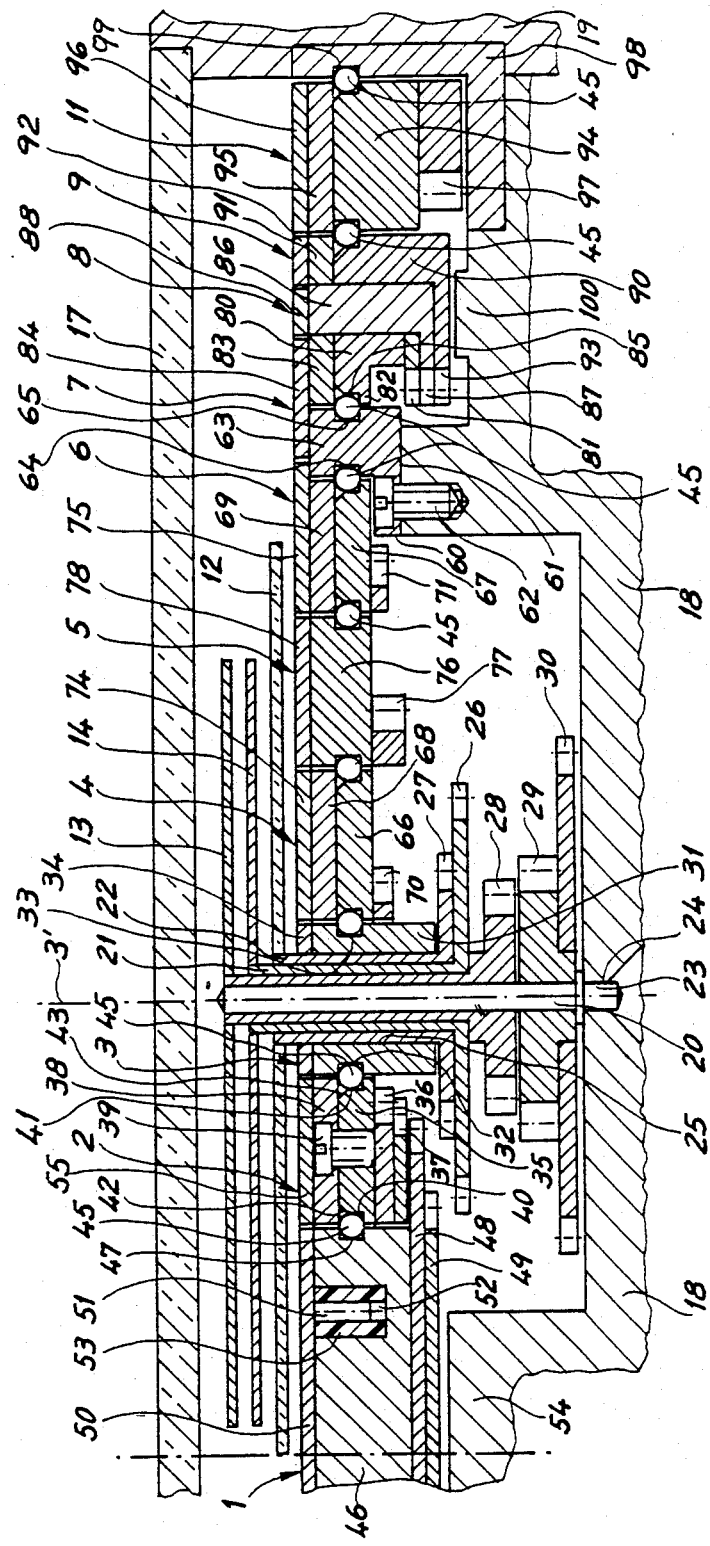
FIG. 3 is a partial cross-section along line III—III of the planetarium of FIG. 1.

In order better to understand the manner in which the discs, rings and hands of FIGS. 1 and 2 are arranged and driven, it will be necessary to refer to FIG. 3 which represents a cross-sectional view of the arrangement of FIG. 1 along line III—III. On this cross-section may be seen disc 1, rings 2 to 9 and 11, disc 12, the hands 13 and 14 as well as glass 17. This FIG. likewise shows a base plate 18 serving as support to the different moving members and a case 19 surrounding the arrangement and bearing the glass 17. On the other hand, a certain number of the components of the arrangement according to the invention have been left out of this FIG. in order not to overcharge it. Thus, there will be found only a portion of the wheel sets which are included in the gear trains.

Before describing the structure of the arrangement, it should be initially mentioned that the upper surfaces of disc 1 and the rings 2 to 9 and 11, i.e. the visible surfaces which bear the distinctive signs of the planets and which are found on the side of glass 17, are arranged substantially in the same plane. Furthermore, the different display elements associated with the planets are pivotally mounted on the base plate by means of ball bearings.

The arrangement of FIG. 3 includes four distinctive portions:

the display and driving means associated with the Earth;

the display and driving means associated with Mercury and Venus;

the display and driving means associated with Mars, Jupiter and Saturn; and the display and driving means associated with Uranus, Neptune, Pluto and the ecliptic.

As has been mentioned hereinbefore, the display means associated with the Earth include disc 12 effecting one rotation every 24 hours and schematically representing the Earth, the first hand 13 effecting one rotation in a little more than 29 days and bearing the Moon symbol and the second hand 14 referred to as the Dragon hand. This disc and these hands are fixed by being driven onto three concentric shafts, i.e. a Moon shaft 20 bearing the hand 13, a Dragon shaft 21 bearing hand 14 and a 24-hour shaft 22 bearing disc 12. The Dragon shaft 21 in the form of a pipe is mounted on the Moon shaft 20 and the shaft 22 of the 24 hour disc likewise in the form of a pipe, is mounted on the Dragon shaft 21.

The Moon shaft 20 includes at its end opposed to that bearing hand 13 a pivot 23 engaged in a hole 24 forming a bearing in the base plate 18. The three shafts pivot in a hole 25 borne by the ring 3 associated with the Earth.

Dragon shaft 21 and 24-hour shaft 22 bear respectively wheels 26 and 27. The Moon shaft 20 bears three wheels 28, 29 and 30, wheel 28 being fixed to the shaft while wheels 29 and 30 fixed to one another are freely mounted. Each of these wheels is coupled to a gear train, not shown on the drawing, and which will be described more precisely hereinafter.

As has already been said, the Earth ring 3 is fixed. It includes more precisely a bridge 31 likewise of annular form fixed to base plate 18 by means which are not shown. The two lateral faces of this bridge each include a groove 32 and 33 respectively situated in the upper half of the ring, the purpose of such grooves being set forth more precisely hereinafter. The bridge is capped by an annular leaf 34 forming a dial, fixed to the bridge by means of feet force driven into bushings fixed to the bridge. Such assembly will be subsequently described with reference to disc 1.

The display means associated with Mercury and Venus comprise disc 1 and ring 2.

The ring 2 comprises an annular body 35 having an inverted T cross-section. The body 35 bears on its lower face two hoops 36 and 37 rigidly fixed to body 35 either by welding or by screwing. The periphery of each of hoops 36 and 37 bears teeth coupled to the gear train as will be explained hereinafter.

Ring 2 further comprises an annular plate 38 of interior and outer diameters respectively equal to the interior and outer diameters of the lower portion of body 35. This plate is fixed to body 35 by means of screws one of which 39 is shown on FIG. 3.

Body 35 and plate 38 define thus two lateral grooves an interior groove 40 and an exterior groove 41. It is further necessary to mention that the body 35 includes bevels 42 and 43 coupling the lateral faces to the upper face. The utility of these bevels will be set forth subsequently.

Thus, as will be seen on FIG. 3, the outer groove 41 of ring 2 is situated facing the interior groove 32 of ring 3.

The two grooves 32 and 41 define an annular pathway of square cross-section on the interior of which are housed balls 45. These balls assure positioning and movement of ring 2 on ring 3. It should be here noted that in order to simplify the numbering of the components the balls of all the bearings bear the reference 45.

Ring 2 further includes an annular leaf 55 bearing the symbol of Venus and fixed to body 35 by feet driven into bushings not shown on the drawing.

Before explaining how the assembly of rings 2 and 3 may be brought about, it is still necessary to describe the different parts included in disc 1. The latter comprises a body 46 provided with a lateral groove 47 placed at the same level as the lateral groove 40 of ring 2 and defining with this latter an annular path of square cross-section, likewise containing balls 45. Disc 1 further comprises two superposed flanges 48 and 49 fixed to the lower face of body 46, for instance by means of screws not shown on the drawing.

Body 46 is covered on its upper face with a circular leaf 50 bearing at its center the image 15 representing the Sun and at its periphery the symbol for Mercury. This leaf includes on its lower face the feet of which one, 51, is fixed into a hole 52 of body 46 by means of a bushing 53 advantageously formed from plastic. Such mode of fastening is likewise employed for the assembly of the leaves which cover each of the rings.

In order to effect the assembly of the different parts described up to the present, one begins by placing the gear trains which will be described hereinafter, into place on the base plate as well as the Moon shaft 20, the Dragon shaft 21 and the 24-hour shaft 22. Thereafter the bridge 31 which positions and maintains the three shafts, is fastened to the base plate. The body 46 of disc 1 provided with its two flanges 48 and 49 is thereafter approximately positioned. The lower flange 49 is supported on a boss 54 of the base plate. Body 35 of ring 2 provided with its two hoops 36 and 37 is then inserted between bridge 31 and body 46. The lower face of hoop 37 is supported on the upper face of the upper flange 48.

In this position the grooves 40 and 41 are respectively placed below the grooves 47 and 32. Because of bevels 42 and 43 borne respectively by grooves 40 and 41, the spaces between the body 35 of ring 2 and the bridge 31 on one hand, and the body 46 on the other hand, are sufficient to introduce therein balls 45. The latter are housed in the bearing paths defined respectively by the grooves 32 and 41, and 40 and 47 at the level of grooves 32 and 47. When thereafter the upper plate 38 is fastened onto body 31 by means of screws 39, plate 38 is supported on the balls and the tightening of the screws 39 raises the body 35 to the point where the upper plate 38 being pressed against body 35, grooves 32 and 41 are at the same level. Furthermore, as the groove 47 of body 46 is initially at a level lower than groove 32, there results that the fastening of plate 38 likewise raises disc 1. In this manner disc 1 and ring 2 are pivotally mounted on ring 3 which itself is rigidly fastened to the base plate.

There then remains nothing more than to put into place the leaves 34, 50 and 55, then to press on disc 12 and the hands 13 and 14.

Mars, Jupiter and Saturn are the three planets of greatest importance of the part of solar system found beyond the Earth. Their trajectory is represented by symbols borne respectively on rings 4, 5 and 6. These rings are pivotally mounted between bridge 31 and a bridge 60 borne by the base plate 18. This bridge 60 includes a seat 61 supported against base plate 18 as well as an annular portion 63 extending in the thickness of the neighbouring rings 6 and 7. It is fastened to the base plate 18 by screws, one of which 62 is shown on the drawing. The inner and outer faces of portion 63 include respectively grooves 64 and 65 intended to define annular pathways for balls 45.

The rings 4 and 6 have a structure similar to that of ring 2. Each of them includes a body 66, 67 in the form of an inverted T and an upper plate 68 and 69 respectively. The lower faces of bodies 66 and 67 each bear a hoop 70 and 71 provided with exterior teeth intended to mesh with the gear train which will be described hereinafter. The upper edges of bodies 66 and 67 are truncated by bevels, not referenced, which enable, as has been explained hereinabove, the putting into place of the balls.

The upper plates 68 and 69 and the bodies 66 and 67 to which they are respectively screwed define raceways for balls 45. The upper plates 68 and 69 are respectively covered with annular leaves 74 and 75 bearing respectively the symbol for Mars and the symbol for Saturn.

Ring 5 includes an annular body 76 the lateral faces of which are each provided with a raceway, not referenced, for balls 45. These grooves are aligned with those of the neighbouring rings. The lower face of body 76 bears a hoop 77 provided with outer teeth. Body 76 is covered with an annular leaf 78 bearing the symbol of Jupiter.

To bring about the pivoting assembly of rings 4, 5 and 6, one begins by putting into place bodies 66, 76 and 67.

More precisely, body 67 is supported on seat 61. The bodies 66 and 76 rest on bosses of the base plate, not shown on the drawing. These bosses and the seat 61 are dimensioned so that the lower faces of the grooves which are borne by bodies 66 and 67 are located at a level below the lower faces of the grooves of body 76 and the bridges 31 and 60. In this manner the balls 45 may be put into place in the same manner as has been explained hereinabove. Following this, plates 68 and 69 are applied respectively to bodies 66 and 67 by means of screws not shown on the drawing. The three rings are thus pivotally mounted. It is then sufficient to fix in a manner similar to that employed for plate 50 the annular leaves 74, 75 and 78 in order to terminate the assembly of this portion of the arrangement.

The display means associated with Uranus, Neptune and Pluto form, with the display means for the ecliptic, the peripheral portion of the display zone. Thus, as has been mentioned hereinabove, these display means are respectively borne by rings 7, 8, 9 and 11. In contrast to the assemblies described hereinbefore, rings 7, 8 and 9 are not coupled among themselves by ball bearings. This is rendered possible by the fact that the rotation period of these planets is extremely long. It is thus necessary to wait more than eighty years in order that ring 7 make one rotation more than ring 8. Under these conditions the frictional forces of the rings against one another produces only very small energy losses.

More precisely, ring 7 includes a body 80 having a section in the form of an F turned upside down, the horizontal bars 81 and 82 of which face towards the center of the arrangement, a plate 83 and an annular leaf 84.

The median horizontal bar 82 defines with plate 83 a groove 85 forming with groove 65 of bridge 60 a raceway for balls 45. The edge of body 80 proximate groove 85 is truncated by a bevel, not referenced, in order to enable putting into place the balls in the same manner as explained hereinabove. The lower bar 81 bears interior teeth intended to enable driving the disc as will be described hereinafter.

Ring 8 comprises a body 86 having a section in the form of an L, the horizontal bar 87 of which is turned towards the center of the arrangement and bears interior teeth intended to bring about driving of ring 8. The body 86 is covered with an annular leaf 88 bearing the symbol for Neptune.

Ring 9 includes a body 90 having a section in the form of an L, an upper plate 91 and an annular leaf 92. The body 90 comprises more precisely a horizontal extension 93 forming the horizontal bar of the L and bearing interior teeth. The exterior upper part of body 90 includes a cut-away portion which defines with plate 91 a raceway, not referenced. The exterior upper edge is truncated by means of a bevel intended, as has been previously explained, for the placing of the balls.

Ring 11 includes a body 94, a plate 95, a leaf 96 as well as a hoop 97. Body 94 exhibits in the upper portion of its lateral faces, cut-aways which define with plate 95 raceways which are not referenced. The hoop 97 bears interior teeth intended to mesh with a wheel in a gear train in order to assure driving of the ring.

The assembly of the different portions is brought about in a manner similar to that described for the other rings.

In order to assure positioning of the rings 7, 8, 9 and 11, the base plate bears an annular bridge 98 fastened by means not shown. This bridge is provided with a groove 99 placed at the same height as the outer groove of ring 11 in order to define therewith a raceway for balls 45.

In order to assemble rings 7, 8, 9 and 11, one begins by putting into place body 94 provided with hoop 97. The lower face of hoop 97 is supported on bridge 98. The balls 45 are inserted in a manner such that they take up positions in groove 99 and then the plate 95 is fastened by screws not shown. Ring 11 is thus mounted pivotally on bridge 98. The following operation consists in putting into place rings 7, 8 and 9 embedded into one another. The lower face of the extension 93 is supported on a boss 100 of base plate 18. After the balls have been introduced into the raceways, plates 83 and 91 are respectively fixed to bodies 80 and 90 by means of screws not shown. Thereafter the upper faces of plates 83 and 91 and of the body 86 are respectively covered by leaves 84, 92 and 88.

To the extent that the means for driving the discs, the hands and the rings have been correctly put into place, the arrangement is ready to operate.

Prior to describing in detail the driving means, it is necessary to note the particular aspect presented by the display means and more particularly the assembly of the concentric rings. If each of these rings is thicker than a display disc as known in the prior art would be, it is clearly less so than the assembly of piled up discs. Furthermore, the gear trains may be distributed over the entire surface of the base plate and no longer need be assembled at the center as was necessary in known arrangements.

Being given the complexity and the large number of moving parts which are included in the different gear trains it would not have been practical to represent all of these on the same FIG.. Thus, in order to facilitate understanding, the different gear trains are described in the following order:

gear train for the 24 hour disc, the Moon and Dragon hands, as well as the ecliptic ring.

gear train for the disc associated with Mercury and the rings for Venus and Mars.

gear train for the rings of Saturn, Jupiter, Uranus, Neptune and Pluto.

Figure 4:
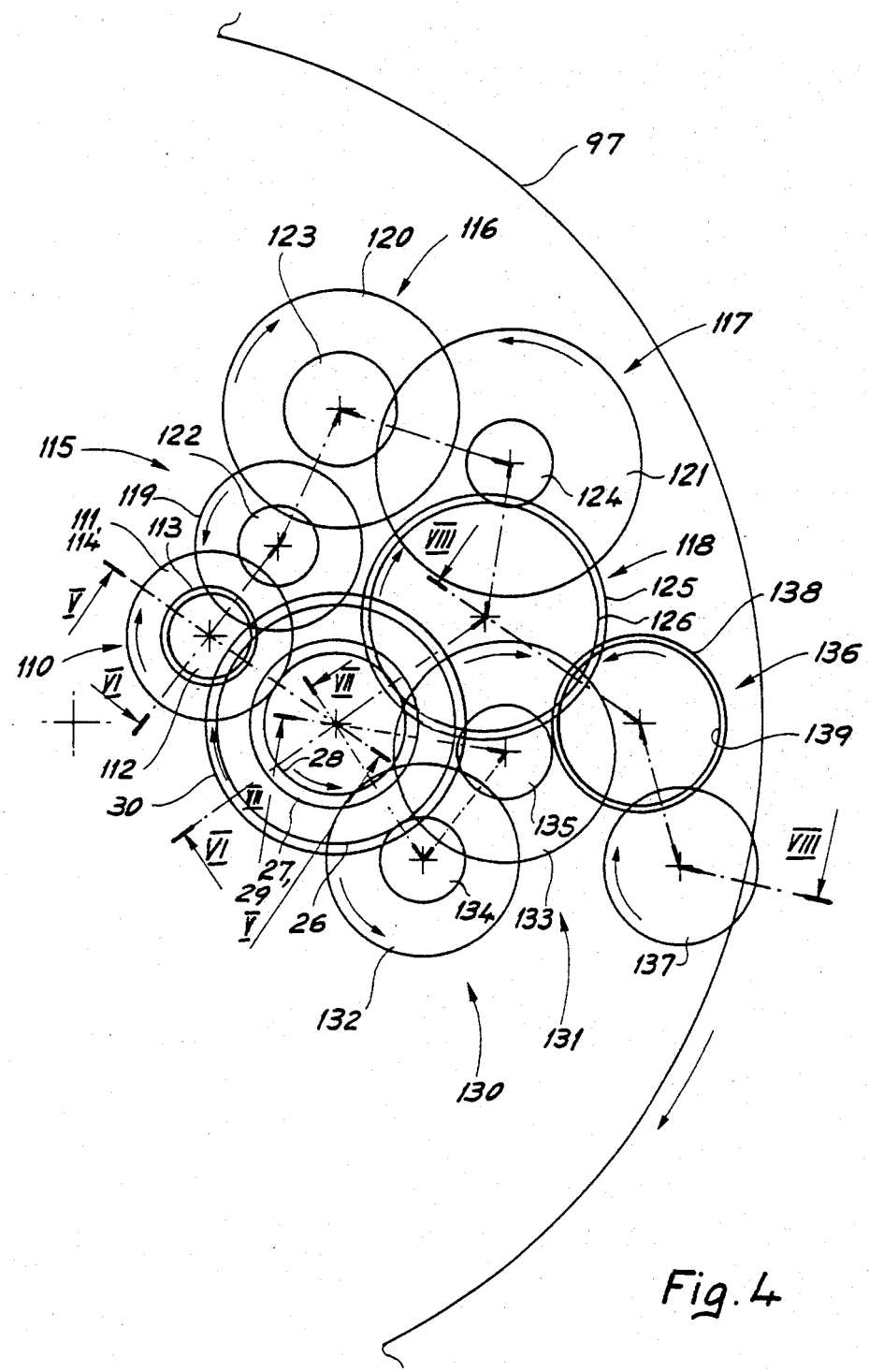
FIG. 4 is a schematic plan view of the gear train driving the display means associated with the Earth, the Moon, the ecliptic as well as the Dragon hand.

For better understanding of the structure of the driving means of the 24 hours disc, the Moon and Dragon hands as well as the ecliptic ring, reference should be made to FIG. 4 which represents in plan the gear trains enabling display of these different functions and to FIGS. 5 to 8 each of which represents a part of the gear trains of FIG. 4 and more precisely those for driving respectively the 24 hours disc, the Moon and Dragon hands as well as the ecliptic ring.

Thus, as has been mentioned hereinabove, wheels 29 and 30 are fixed to one another and freely mounted on shaft 20 bearing the Moon hand. Wheel 30 is coupled to the hour wheel of a traditional timepiece by a train of intermediate gears not shown on the drawing. The number of teeth which the wheel 30 bears is chosen in a manner such that it make one rotation each 24 hours.

On FIGS. 4 and 5 one may likewise see wheels 26, 27 and 28 coaxial with wheels 29 and 30 as well as a wheel set 110 including four wheels 111, 112, 113 and 114 fixed to one another. Wheels 27 and 29 on the one hand and 111 and 114 on the other hand are shown by the same circle since they all have the same diameter. Wheel 27, which bears the 24 hours disc, thus effects one rotation per solar day. This is the same as to say that the gear train coupling wheel 29 to wheel 27 has only the function of an intermediate since the two wheels turn at the same speed.

More precisely, each of wheels 27, 29, 111 and 114 include 37 teeth. This intermediate train is rendered necessary by the fact that it is desired to see the 24 hours disc behind rather than in front of the Moon and Dragon hands. The function of wheels 112 and 113 will be explained subsequently.

The gear train intended to drive wheel 28 associated with shaft 20 which bears the Moon hand 13 is represented in cross-section on FIG. 6. It may be identified on FIG. 4 by the broken line VI—VI which connects the moving portions of the gear train. This latter is driven by the wheel set 110 and more particularly by its wheel 112. It includes in addition to the wheel set 110 and wheel 28 four wheel sets 115 to 118. The wheel sets 115 to 117 are each provided with driven wheels respectively referenced 119, 120 and 121 and driving wheels respectively referenced 122, 123 and 124. The wheel set 118 includes two superposed wheels 125, 126. Wheel 125 operates as intermediate. Wheel 126 serves as a connection to another gear train as will be subsequently explained.

The following table has as its purpose to enable calculation of the rotation speed of wheel 28 bearing the Moon hand. It includes four columns, the first two relating to the driving wheels, the other two to the driven wheels. The first and third columns indicate the reference numbers of the wheels, the second and fourth columns the number of teeth.

| Driving Wheels | | Driven wheels | |
|---|---|---|---|
| Reference | Number of teeth | Reference | Number of teeth |
| 112 | 16 | 119 | 37 |
| 122 | 16 | 120 | 51 |
| 123 | 29 | 121 | 71 |
| 124 | 22 | 28 | 36 |

Wheel 125 which functions only as an intermediate includes 65 teeth.

In order to calculate the time necessary for the wheel 28 to effect a complete revolution and knowing that the first wheel set effects one revolution per day, it is sufficient to calculate the ratio of the product of the number of teeth of the driven wheels by the product of the number of teeth of the driving wheels. This ratio is equal to 29.5305. This represents 29 days, 12 hours, 44 minutes, 2.8 seconds, i.e. to the tenth of a second the average value of a lunar month.

The gear train intended to drive the wheel 26 fixed to cannon 21 and which bears the Dragon hand is shown on FIG. 7. It may be identified on FIG. 4 by the broken line VII—VII which connects the wheel sets of this gear train.

This latter exhibits two intermediate wheel sets, 130 and 131, each including a driven wheel indicated respectively by references 132 and 133, and a driving wheel respectively indicated by references 134 and 135.

The following table has the same form as the preceding table and gives the characteristics of the wheel train of the Dragon hand.

| Driving wheels | | Driven wheels | |
|---|---|---|---|
| Reference | Number of teeth | Reference | Number of teeth |
| 88 | 36 | 132 | 57 |
| 134 | 22 | 133 | 52 |
| 135 | 22 | 26 | 69 |

In order to calculate the period of a rotation, one proceeds in the same manner as hereinabove in knowing that wheel 28 effects one rotation in 29 days, 12 hours, 44 minutes and 2.8 seconds. There results therefrom that the Dragon hand effects a rotation in 346.6183364 days, i.e. 346 days, 14 hours, 50 minutes and 24 seconds. The rotation sense of this hand is opposite to that of the Moon hand since this gear train includes two intermediate wheels.

In theory, the Moon and the Dragon hands ought to be in conjunction every 27 days, 5 hours, 5 minutes and 35.8 seconds, this period of time being referred to as the month of the Dragon.

In the present arrangement, the period between conjunctions is equal to 27 days, 5 hours, 5 minutes and 34.9 seconds. The precision over one month is thus better than to the second.

The gear train intended to drive the ecliptic ring 11 is shown in cross-section on FIG. 8. It may be identified on FIG. 4 by the broken line VIII—VIII which connects the centers of the wheel sets of this gear train. This latter is attached to the gear train driving the wheel bearing the Moon hand by the wheel set 118 and more precisely, by wheel 126. It drives the toothed hoop 97 borne by the ecliptic ring 11. It includes two wheel sets, 136 and 137. The wheel set 136 is provided with two superposed wheels, the driven wheel 138 and the driving wheel 139. The wheel set 137 includes one wheel only acting as intermediate.

The following table has the same structure as the preceding tables and exhibits the characteristics of the driving wheel train of the ecliptic ring.

| Driving wheels | | Driven wheels | |
|---|---|---|---|
| Reference | Number of teeth | Reference | Number of teeth |
| 126 | 61 | 138 | 45 |
| 139 | 35 | 97 | 325 |

The wheel set 137 which functions as an intermediate includes 35 teeth.

The period of the ecliptic ring is calculated in the same manner as the foregoing, i.e. from the ratio of the gearing taking into account, as may be well understood, the part in common with the gear train driving wheel 28.

This period is 365 days, 5 hours, 48 minutes, 46.6 seconds. Now, since the theoretical duration of the tropical year, i.e. the period which the Earth requires to effect a complete revolution about the Sun, is 365 days, 5 hours, 48 minutes and 46 seconds, the precision over a year is better than to the second.

Before analyzing the gear trains enabling the driving of the Mercury disc and the rings associated with the other planets, it should be brought out that the period of rotation of these discs and rings must be chosen equal to the period of synodical revolution of these planets (period measured in the frame of reference Earth-Sun) and not to the period of sidereal revolution (period measured in the frame of reference Sun-Stars).

This will be readily understood since in the arrangement according to the invention the ring associated with the Earth is fixed. Now the Earth has a rotational movement the period of which, referred to as tropical year, is 365.24219 days, i.e. 365 days, 5 hours, 48 minutes and 46 seconds. In order to correctly represent the movement of rotation of the planets in the frame of reference Sun-Earth, it is necessary to deduct from the angular velocity of the planets around the Sun the angular velocity of the Earth around the Sun. The consequence of this is that in the planetarium according to the invention the planets close to the Sun (Mercury and Venus), the period of revolution of which is less than that of the Earth, turn in the normal sense, i.e. counter clockwise but at an angular velocity less than their velocity of rotation around the Sun.

On the other hand, the planets further from the Sun than the Earth, for instance Mars, have a period of revolution greater than that of the Earth (or a reduced velocity). In the planetarium according to the invention, the rings associated with these planets must thus turn in the clockwise sense. It may be furthermore remarked that the rings associated with the planets the furthest away (Neptune, Uranus and Pluto), rotate almost at the rate of one rotation per year in the clockwise sense since their velocity of rotation around the Sun is very low.

The synodical periods of revolution mentioned hereinafter are drawn from "Landolt-Börnstein; Numerical data and functional relationships in science and technology, group VI, volume I, Springer Verlag, Berlin 1965".

Figure 9:
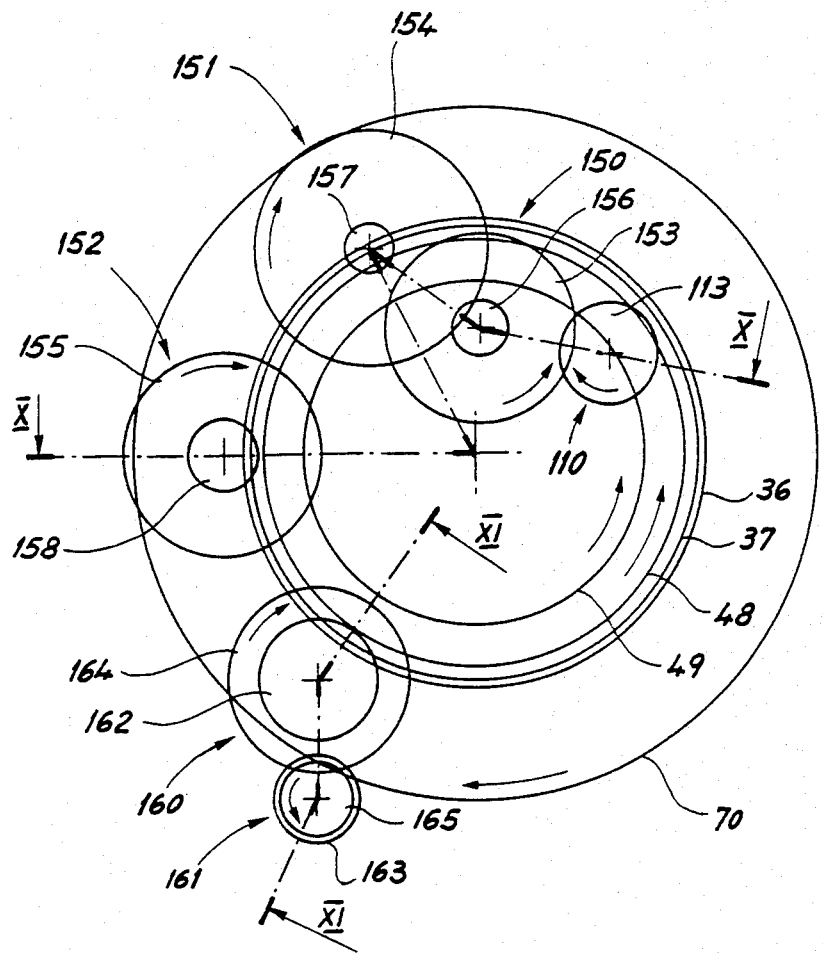
FIG. 9 represents, in plan, the gear trains driving the display means associated with Mercury, Venus and Mars.

The gear trains enabling driving of the disc of Mercury and the ring for Venus are shown in plan view on FIG. 9 and in cross-section on FIG. 10.

This gear train is driven by the wheel 113 belonging to the wheel set 110 and which makes one rotation in 24 hours. It includes the toothed hoops 36 and 37 fixed to the Venus ring 2 and the wheels 48 and 49 fixed to the Mercury disc 1, as well as three intermediate wheel sets bearing references 150 to 152.

Each of these wheel sets is provided with a driven wheel referenced respectively 153 to 155 and a driving wheel referenced respectively 156 to 158.

More precisely, wheel sets 150 and 151 are inserted between wheel set 110 and the flange 48 while wheel set 152 is inserted between flange 49 and the toothed hoop 36.

The following table has the same structure as the preceding tables and exhibits the characteristics of the gear trains driving the Mercury disc and the Venus ring.

| Driving wheels | | Driven wheels | |
|---|---|---|---|
| Reference | Number of teeth | Reference | Number of teeth |
| 113 | 20 | 152 | 38 |
| 155 | 10 | 153 | 57 |
| 156 | 10 | 48 | 107 |
| 49 | 70 | 154 | 40 |
| 157 | 11 | 36 | 97 |

The period of the Mercury disc is calculated from the ratio of the product of the number of teeth of the driven wheels 152, 153 and 48 to the product of the number of teeth of the driving wheels 113, 155 and 156. This period is 115.88 days which corresponds exactly to the synodical period of revolution of this planet.

The period of the Venus ring is obtained from the ratio of the product of the number of teeth of all the driven wheels to the product of the number of teeth of all the driving wheels from the table hereinabove. This period is 583.92 days, which corresponds to the synodical period of revolution of Venus.

The gear train enabling driving of ring 6 associated with Mars is shown in cross-section on FIG. 11. It is likewise visible on FIG. 9 identifiable by the broken line XI—XI which connects the centers of the wheel sets of this gear train. This latter includes two wheel sets 160, 161 coupling the toothed hoop 37 fixed to the Venus ring to the toothed hoop 70 fixed to the Mars ring. Each of these two wheel sets includes a driven wheel 162 respectively 163 and a driving wheel 164 respectively 165.

The following table has the same structure as previous tables and shows the characteristics of the gears driving the Mars ring.

| Driving wheels | | Driven wheels | |
|---|---|---|---|
| Reference | Number of teeth | Reference | Number of teeth |
| 37 | 94 | 162 | 24 |
| 164 | 36 | 163 | 15 |
| 165 | 9 | 70 | 113 |

The period of the Mars ring is calculated from the ratio of the product of the number of teeth of the driven wheels 162, 163 and 70 to the product of the number of teeth of the driving wheels 37, 164 and 165 in knowing that the wheel 27 effects a rotation in 583.92 days. This period is 779.94 days, which corresponds exactly to the synodical period of revolution of Mars.

It should be noted that the gear train inserted between the toothed hoops 37 and 70 includes an even number of wheel sets which signifies that these two hoops have a different sense of rotation.

Figure 12:
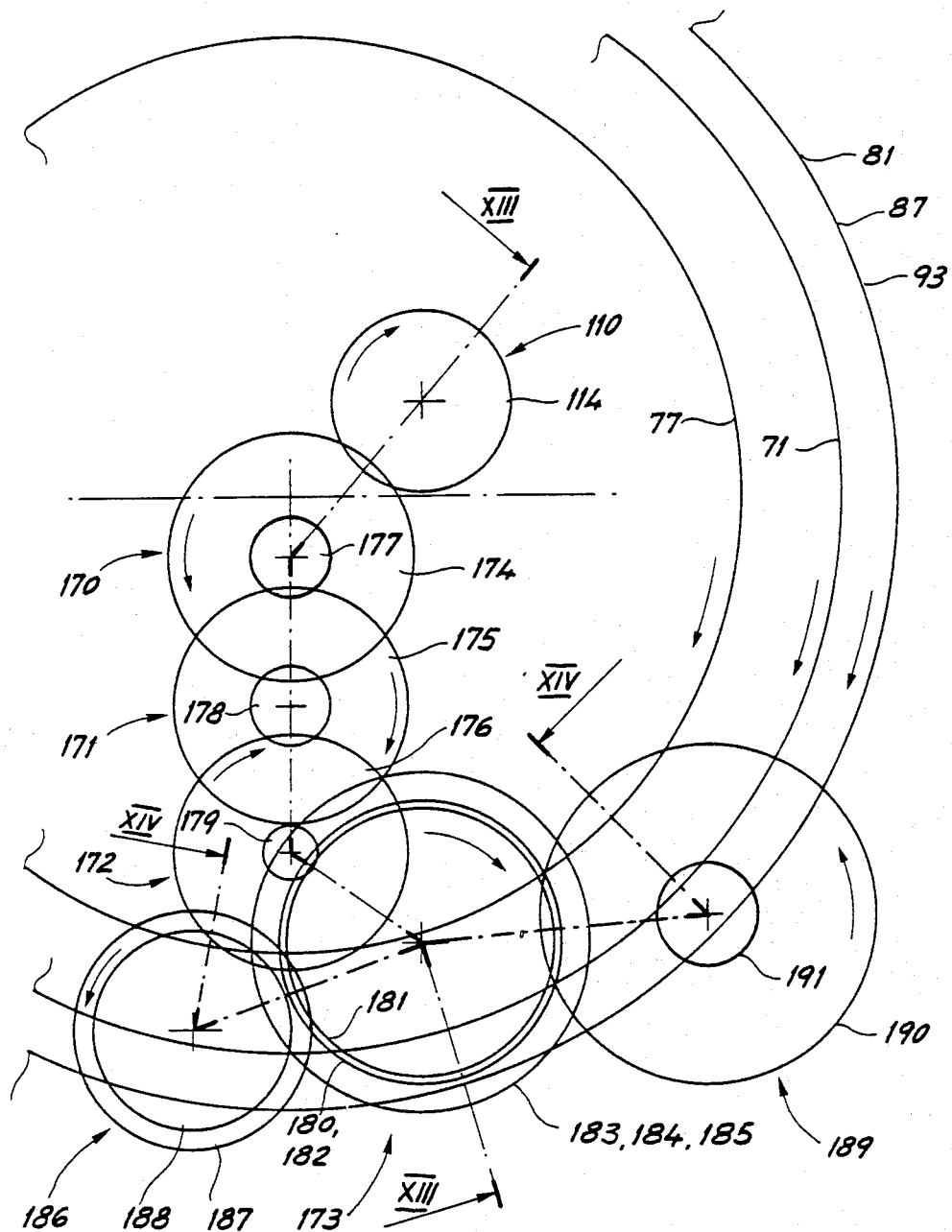
FIG. 12 is a plan view of the gear trains driving the display elements associated with Saturn, Jupiter, Uranus, Neptune and Pluto.

In order to analyze more closely the structure of the gear trains associated with the distant planets, reference should be made to FIG. 12 in which they are represented in plan view, as well as to FIGS. 13 and 14 which represent respectively the gear trains for Neptune, Uranus and Pluto and for Jupiter and Saturn.

In order not to overload this description, we will describe initially the gear train driving the most distant three planets, then that driving Jupiter and Saturn.

The gear train driving the Neptune, Uranus and Pluto rings is shown in cross-section on FIG. 13. It may be identified on FIG. 12 by the broken line XIII—XIII which connects the centers of the wheel sets included in this train. This latter is driven by wheel 114 belonging to the wheel set 110 and which makes one rotation per day. It includes four wheel sets 170, 171, 172 and 173. The first three wheel sets are each provided with a driven wheel respectively 174, 175 and 176 and a driving wheel respectively 177, 178 and 179. The wheel set 173 includes a driven wheel 180 and five driving wheels 181 to 185 which are superposed and fixed to one another. Wheels 181 and 182 are respectively intended to drive the gear trains for Jupiter and Saturn. Wheel 183 meshes with the toothed hoop 93 of the Pluto ring 9. Wheel 184 meshes with the toothed hoop 87 of the Neptune ring 8 and wheel 185 meshes with the toothed hoop 81 of the Uranus ring 7.

The following table has the same structure as the preceding tables and exhibits the characteristics of the gear trains driving the rings for Uranus, Neptune and Pluto. The first part of this table is common to the driving of these three rings as well moreover as those of Jupiter and Saturn as will be explained hereinafter. The last three portions refer respectively to Uranus, Neptune and Pluto.

| Driving wheels | | Driven wheels | |
|---|---|---|---|
| Reference | Number of teeth | Reference | Number of teeth |
| 114 | 37 | 174 | 52 |
| 177 | 18 | 175 | 60 |
| 178 | 18 | 176 | 60 |
| 179 | 12 | 180 | 73 |
| Uranus | | | |
| 185 | 46 | 81 | 179 |

-continued

| Driving wheels | | Driven wheels | |
|---|---|---|---|
| Reference | Number of teeth | Reference | Number of teeth |
| Neptune | | | |
| 184 | 38 | 87 | 147 |
| Pluto | | | |
| 183 | 43 | 93 | 166 |

In knowing that wheel 114 effects one rotation in one day, the rotation period for the rings of Uranus, Neptune and Pluto may be calculated by the ratio of the number of teeth on these wheels as has been the case for the other tables.

The rotation period of the three rings is the following:

| | Rotation period |
|---|---|
| Uranus | 369.65 days |
| Neptune | 367.48 days |
| Pluto | 366.72 days |

Comparatively, the synodical period of revolution of these planets is the following:

| | Synodical period of revolution |
|---|---|
| Uranus | 369.66 days |
| Neptune | 367.48 days |
| Pluto | 366.72 days |

Thus, as may be seen, the rotation periods of the rings and the synodical periods of revolution of the planets are respectively equal, with the exception of Uranus where the last significant FIG. exhibits a spread equal to 1.

To terminate, the gear trains driving the rings of Jupiter and of Saturn are to be examined and more precisely the parts which are not in common with the three most distant planets. These gear trains, seen in cross-section on FIG. 14, are identifiable on FIG. 12 by the broken line XIV—XIV which connects the centers of the wheel sets which these gear trains include.

Wheel 182 belonging to wheel set 173, is coupled to the hoop 77 of the Jupiter ring by a wheel set 186 including a driven wheel 187 and a driving wheel 188.

Wheel 181 likewise belonging to wheel set 173 is connected to the hoop 71 of the Saturn ring by a wheel set 189 comprising a driven wheel 190 and a driving wheel 191.

The following table, the structure of which is similar to that of the preceding tables, is limited to the part of the gear train specific to the driving of the Jupiter and Saturn rings, the first part referring to Jupiter and the second to Saturn.

| Driving wheels | | Driven wheels | |
|---|---|---|---|
| Reference | Number of teeth | Reference | Number of teeth |
| Jupiter | | | |
| 182 | 61 | 187 | 49 |
| 188 | 22 | 77 | 115 |
| Saturn | | | |
| 181 | 68 | 190 | 43 |
| 191 | 34 | 71 | 214 |

In order to calculate the period of rotation of the Jupiter and Saturn rings, it is necessary to calculate the ratio of the product of the number of teeth, in the manner already employed to the present, taking into account the common gear trains and the portion specific to each of these planets.

One thus obtains for the Jupiter ring a rotation period equal to 398.88 days which correspond to the synodical revolution period of Jupiter.

One further obtains for the Saturn ring a rotation period equal to 378.09 days such being equal to a synodical revolution period for Saturn.

Thus for each of the display means the precision obtained is on the same order of magnitude as the natural variation of the synodical revolution period of the planet with which this display means is associated.

Figure 15:
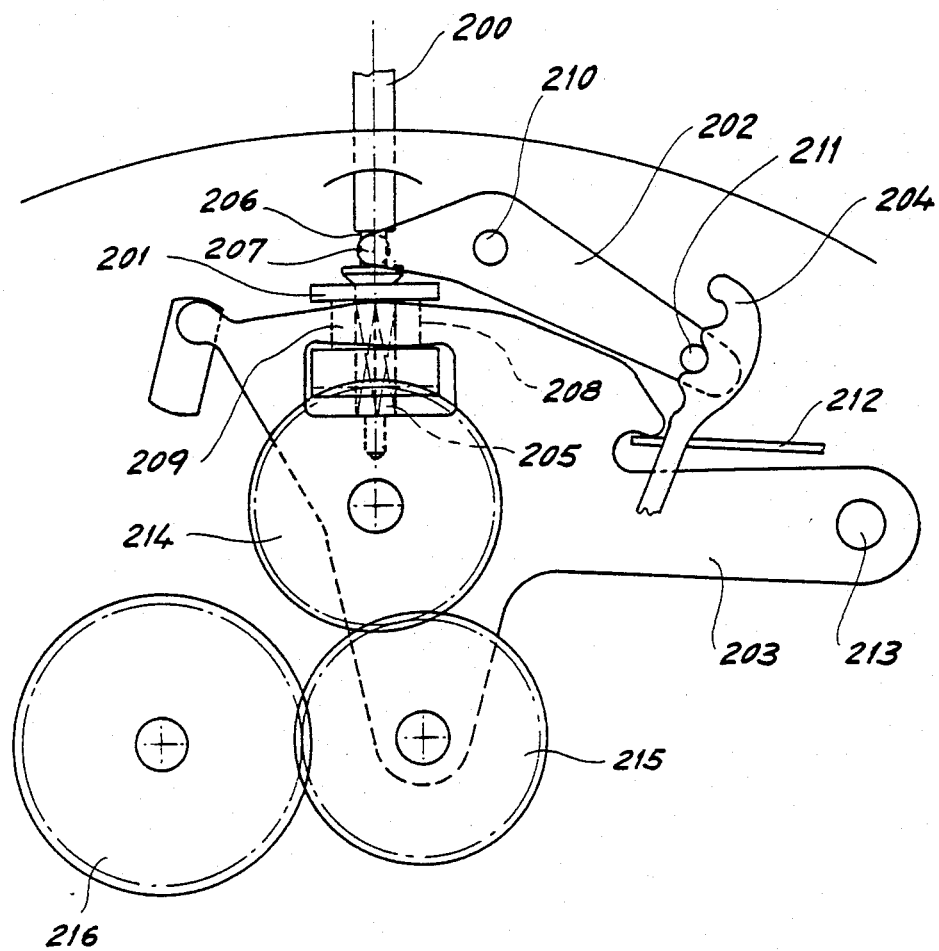
FIG. 15 illustrates a portion of the correcting mechanism of the planetarium.

FIG. 15 represents a mechanism enabling correction of the planetarium when for one reason or another the driving means have not performed their task.

This mechanism includes a setting stem 200, a sliding pinion 201, a trigger piece 202, a lever 203 and a jumper spring 204. The stem 200 is provided with a squared portion 205 on which the sliding pinion may slide axially and a slot 206 in which is engaged a first stud 207 fixed to the trigger piece 202. The sliding pinion includes a groove 208 on the interior of which is engaged an arm 209 forming part of the lever 203. The trigger piece 202 pivots around an axis 210 perpendicular to the plane of the base plate. It includes furthermore a second stud 211 which cooperates with the end of the jumper spring 204. The mechanism further includes a spring 212 acting against a beak of the lever 203. This latter pivots around the axis 213 and is maintained supported against trigger piece 202 by the pressure of spring 212. This lever bears furthermore two setting wheels 214 and 215 which mesh respectively with the sliding pinion 201 and with a wheel set 216 kinematically connected to wheel 30.

The mechanism exhibits in fact all the characteristics of a setting arrangement for a traditional watch. It is arranged so that the stem 200 may occupy three positions. When the stem is pushed in, the lever 203 is in a position such that the setting wheel 215 is free. If the driving means of the planetarium are formed by the movement of a mechanical watch, it is in this position that the charging of the spring of such movement is effected.

When the stem occupies the first drawn out position which is that shown on FIG. 15, setting wheel 215 meshes with the wheel 216 which enables driving all the gear trains of the arrangement and from there to make up for the time during which the arrangement has not operated.

When the driving means of the planetarium are formed by the movement of a watch or a small clock, the seconds, minutes and hours hands may not be driven at the same time as the discs and rings. It is for this reason that it is necessary to provide a friction coupling between the wheel train of the watch and that of the arrangement. This coupling has not been represented being of a type known to those skilled in the art.

If such watch includes a calendar mechanism, the latter is advantageously coupled to the correction means of the planetarium. In this case, it is sufficient to reset the calendar mechanism to the date so that the planetarium is once again in a correct position.

In the second drawn out position, the lever 203 is axially displaced towards the center of the arrangement in a manner such that the setting wheel 215 meshes with a wheel of the motion work of the watch, this wheel not being shown on the drawing.

The arrangement thus described readily permits realization of a planetarium of reduced dimensions and more particularly insofar as its thickness is concerned. As it has been possible to see, this is due to the utilization of concentric rings which permit distributing the different gear trains over the entire surface of the timepiece rather than requiring that they be assembled at the center as has been the case up to the present time.

Furthermore, thanks to the fact that the ring associated with the Earth is fixed, it has been possible to provide the planetarium with information relative to the Moon. In arrangements known to the present, the display of such information was possible only by employing differential gearing, this type of gearing complicating considerably the construction and increasing the volume of the planetarium.

Finally, thanks to the presence of a reticulated network, it is possible to read the position of the planets relative to the Earth, although the relationship between the diameter of the rings and the average distance between the Sun and the planets with which these rings are associated is not constant.

It is at the same time well understood that the arrangement thus described is only one example of application of the invention. It is thus possible to obtain a planetarium which does not include the lunar functions, in which case nothing prevents the employment of a stellar frame of reference, the Earth ring then being movable. In an arrangement of small dimensions, the reticulated network could be eliminated since the correction which it enables is practically of the same order of magnitude as the precision of measurement.

It is self-understood that the numbers of teeth of the wheels of the different gear trains are given only by way of non-limiting example.

Moreover, the driving means of the planetarium could be formed by a synchronous motor driven by an alternating current or by the movement of a watch, of a miniature clock or of a clock of the mechanical or electro-mechanical type.

What I claim is:

1. An arrangement for indicating the position of planets in the solar system comprising:
   a support;
   a plurality of movable elements pivotally mounted on said support and rotatble about a common axis;
   a plurality of display means each respectively mounted on one of said movable elements and comprising a distinctive sign representing a respective planet of the solar system, the position of which is to be indicated by said arrangement;
   motor means; and,
   connecting means for cinematically connecting said motor means to said elements; said connecting means including gear means driven by said motor means, and a plurality of driving means each respectively fixed to one of said elements and gearing with said gear means to drive said elements, at least two of said driving means being arranged substantially in the same plane.

2. An arrangement as set forth in claim 1 wherein at least some of said elements are in the form of a ring the upper surface of which bears said sign.

3. An arrangement as set forth in claim 2 further comprising first ball bearings each provided with two races respectively fixed to said support and to one of said rings.

4. An arrangement as set forth in claim 3 further comprising second ball bearings each provided with two races respectively fixed to two adjacent rings.

5. An arrangement as set forth in claim 4 including a ring fixed to said support and bearing the distinctive sign associated with the Earth, the remaining rings being driven with an angular velocity equal to the difference between the average angular velocities around the Sun, of the planet the sign of which is borne by said ring, and the Earth.

6. An arrangement as set forth in claim 5 further including complementary display means turning about a second axis parallel to said first axis and traversing the ring bearing the distinctive sign associated with the Earth, said complementary display means bearing a distinctive sign associated with the Moon.

7. An arrangement as set forth in claim 5 further comprising movable ring bearing a network defining at least certain specific points included in the ecliptic.

8. An arrangement as set forth in claim 5 wherein the rings bearing the distinctive signs of the planets furthest from the sun have a diameter the ratio to the distance sun-planet of which is less than the ratio between the diameter of the ring bearing the sign of the Earth and the distance Earth-Sun and wherein said support further includes a reticulated network enabling reading of the angular position of the planets seen from the Earth relative to the Sun in spite of the parallax error due to the difference between said ratios.

9. An arrangement as set forth in claim 6 further comprising a movable ring bearing a network defining at least certain specific points included in the ecliptic.

10. An arrangement as set forth in claim 1 wherein a plurality of said elements are each in the form of a ring an upper surface of which provides said display surface, said rings being mounted for rotation concentrically to each other such that the display surfaces of said rings are substantially in the same plane.

11. An arrangement as set forth in claim 1 comprising at least four of said movable elements, and wherein at least four of said driving means are arranged substantially in the same plane.

* * * * *